United States Patent [19]

Schwartzman et al.

[11] Patent Number: 4,719,697
[45] Date of Patent: Jan. 19, 1988

[54] METHOD OF PREPARING COAXIAL CABLE FOR TERMINATION

[75] Inventors: Benjamin Schwartzman, Hagerstown, Md.; Russell A. Clearwater, Waynesboro; Robert Volinskie, Hershey, both of Pa.

[73] Assignee: AMP Incorporated, Harrisburg, Pa.

[21] Appl. No.: 873,827

[22] Filed: Jun. 9, 1986

Related U.S. Application Data

[63] Continuation of Ser. No. 762,463, Aug. 5, 1985, abandoned.

[51] Int. Cl.$^4$ ............................................. H01R 43/04
[52] U.S. Cl. ........................................ 29/867; 29/828; 81/9.51
[58] Field of Search ................. 29/828, 867, 564.8, 29/33 F, 33 M; 81/9.51; 83/924

[56] References Cited

U.S. PATENT DOCUMENTS 2,789,452 4/1957 Millen ........................ 81/9.51 X
3,153,358 10/1964 Havens ........................... 81/9.51
3,267,774 8/1966 Bilco et al. ..................... 81/9.51
3,484,936 12/1969 Schwalm et al. ................ 29/828
3,577,814 5/1971 Hammond ...................... 81/9.51

FOREIGN PATENT DOCUMENTS 1928407 12/1970 Fed. Rep. of Germany ....... 81/9.51

*Primary Examiner*—P. W. Echols
*Assistant Examiner*—Carl J. Arbes
*Attorney, Agent, or Firm*—Adrian J. LaRue

[57] ABSTRACT

Apparatus and method for preparing end of coaxial cable having foamed TFE primary insulation comprises steps of engaging first blades to make a first cut completely through the outer insulation and braid, then withdrawing the blades before making a second cut which penetrates only the outer insulation, then pulling the cable against the second blades to remove slugs of outer insulation and braid as an unit. Braid is subsequently flared by rotating a tool against the exposed braid, and primary insulation is axially compressed to expose the signal conductor.

18 Claims, 24 Drawing Figures

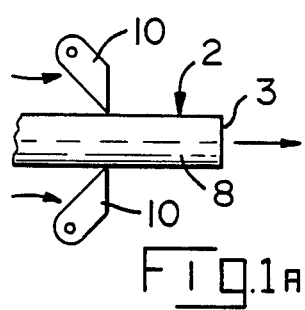
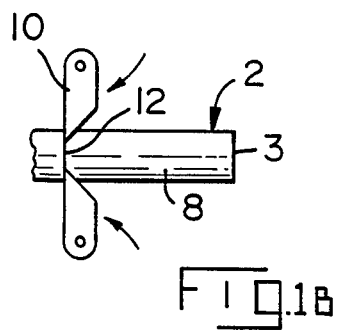
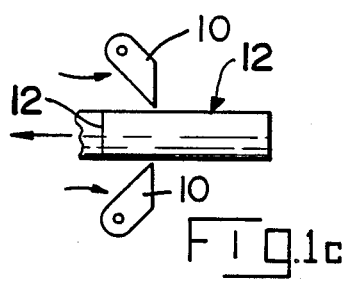
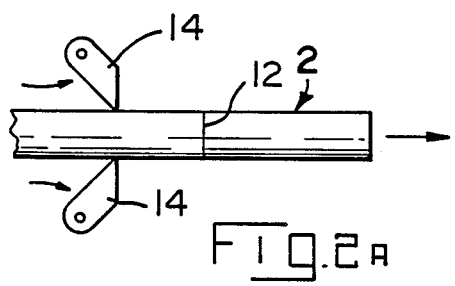
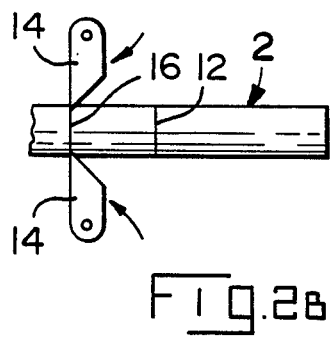
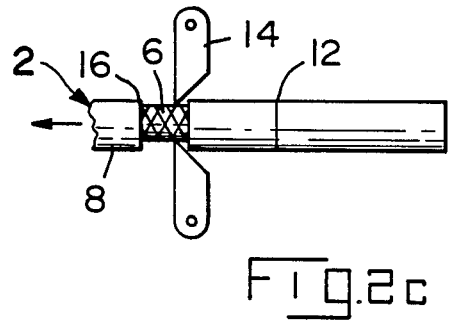
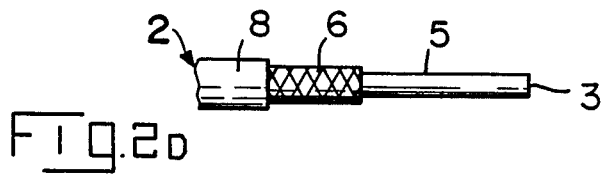

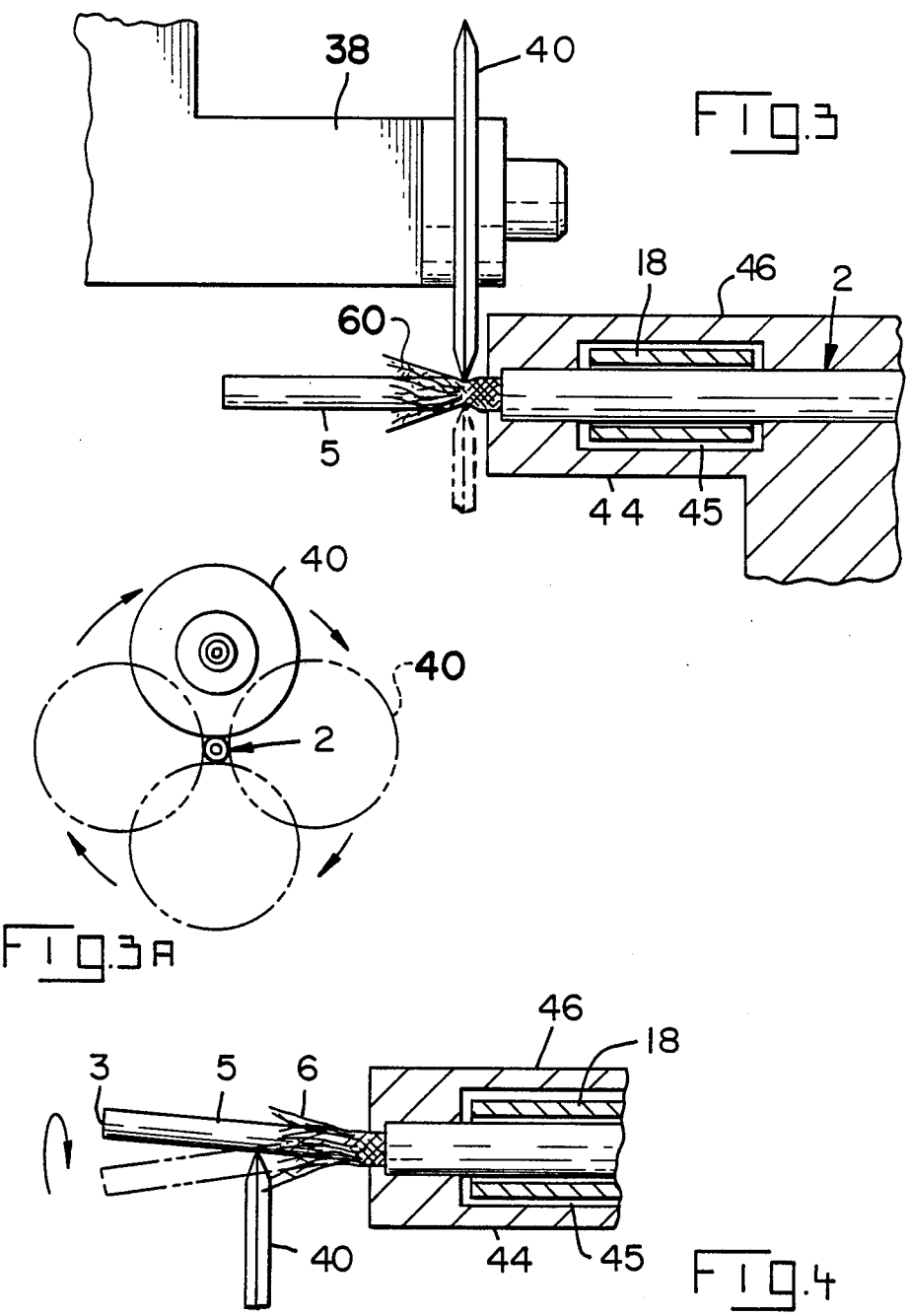

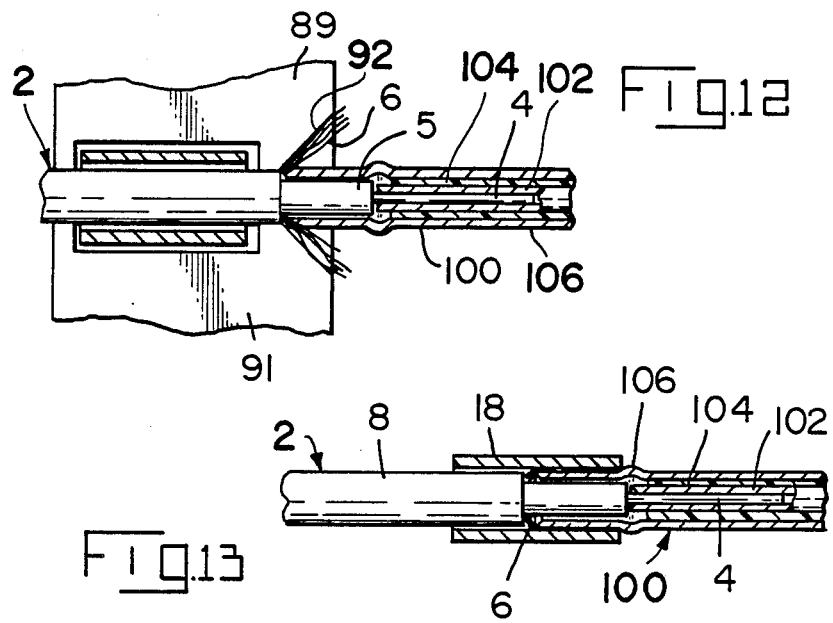

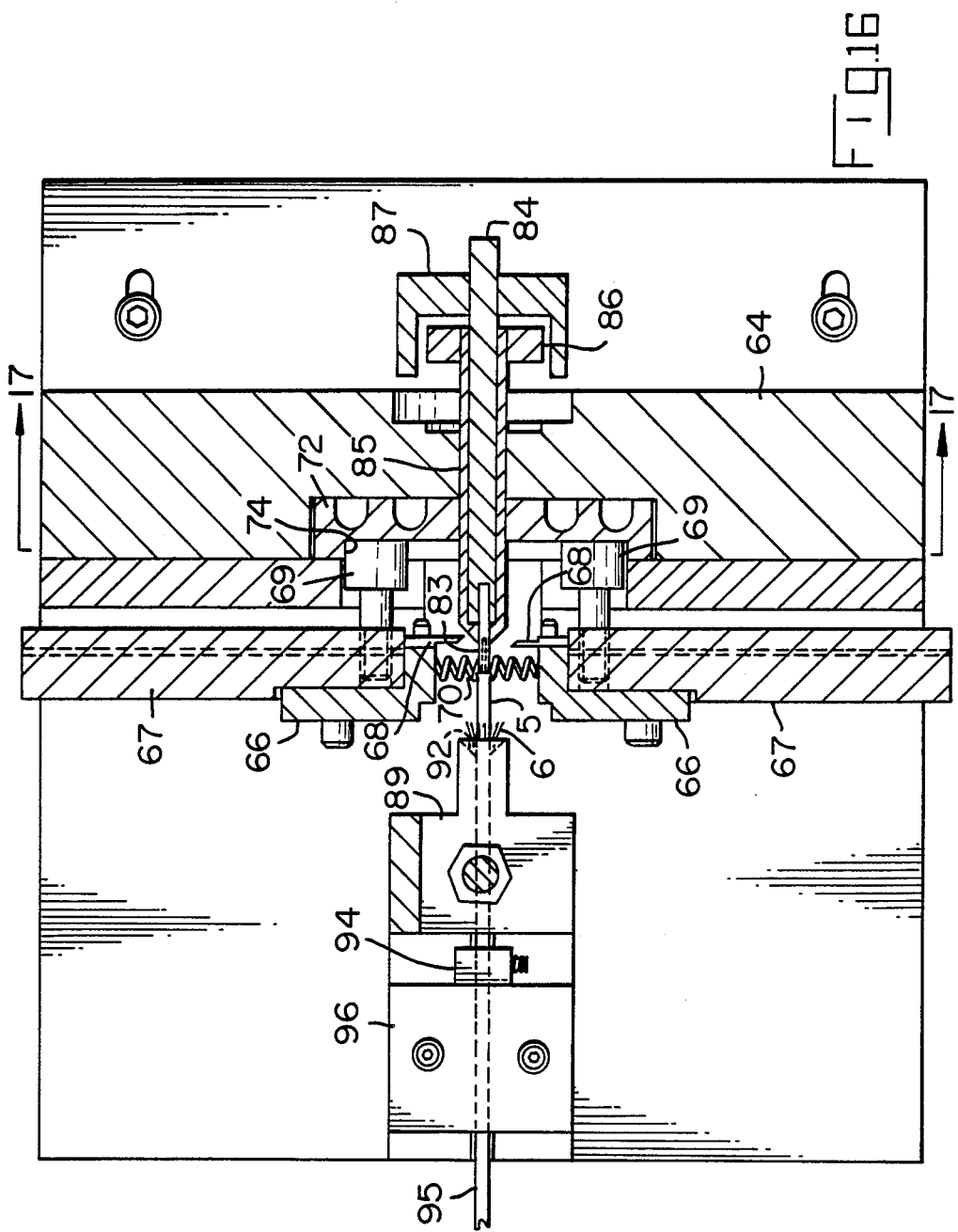

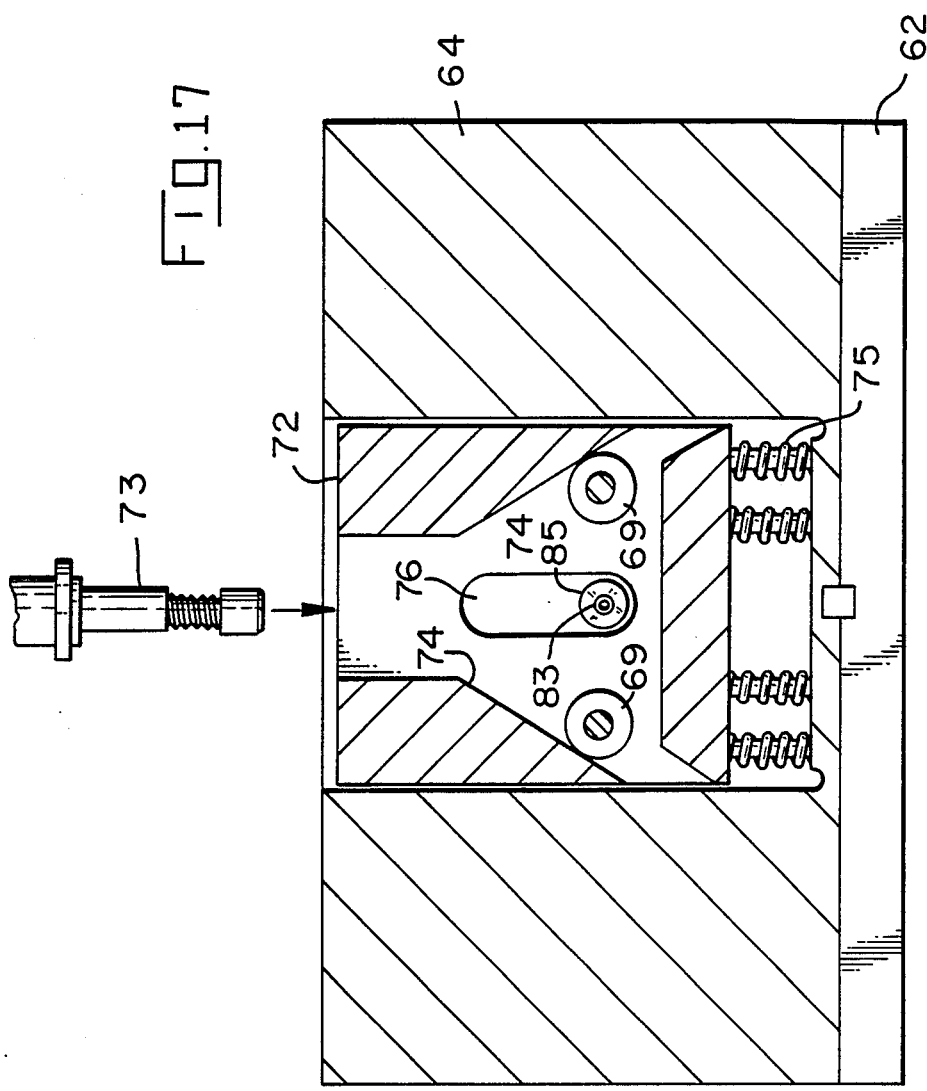

METHOD OF PREPARING COAXIAL CABLE FOR TERMINATION

This application is a continuation of application Ser. No. 762,463 filed Aug. 5, 1985, now abandoned.

BACKGROUND OF THE INVENTION

The present invention relates to method and apparatus for preparing the end of a coaxial cable for termination.

Coaxial cable of the type comprising a signal conductor, a surrounding layer of primary insulation, a braided shield, and an outer insulative jacket is well known. Such cable is typically terminated to a coaxial terminal of the type described in U.S. Pat. No. 3,323,098 and sold by AMP Incorporated as its COAXICON contact. Such contacts have a pin or socket portion which is terminated to the signal conductor and an outer tubular metal shell which is terminated to the braided shield. Before termination, the cable must be prepared by stripping the outer jacket to a second distance from the end of the cable to expose the shield, and stripping away the shield to a first distance less than the second. Additionally, the signal conductor must be exposed toward the end and the shield must be flared to facilitate termination.

U.S. Pat. No. 3,555,672 discloses apparatus and method for accomplishing a coaxial cable termination as described above. According to the method, two sets of blades engage the cable simultaneously at the first and second distances from the end, and are rotated about the cable to cut through the outer insulation and braid at said first distance and to cut the outer insulation at said second distance. The cable is then withdrawn while both sets of blades remain engaged, and the outer insulation between said second distance and said end and said braid between said first distance and said end are removed as a unit. The exposed primary insulation is subsequently cut circumferentially between the first distance and the end and the slug of primary insulation is pulled off to expose the signal conductor. The shield is then flared by gripping the end of the signal conductor and twirling it, the outer jacket being firmly clamped proximate the exposed shield. Alternatively, the end of the primary insulation is gripped and twirled prior to stripping, and the slug is subsequently cut and stripped. Either way, the rotary motion of the primary insulation imparts a flare to the shield.

The above described method works well enough where the primary insulation is polyethylene or other relatively hard material. Recently, however, foamed tetraflouroethylene (TFE), sold under the trademark Teflon by DePont Corporation, has seen increased use due to its good dielectric properties. W. L. Gore & Associates, Inc., makes a coaxial cable for foamed TFE primary insulation, which is in the form of a continuous strip helically wrapped about the signal conductor. TFE insulation is difficult to cut, though, which causes several problems if the cable is prepared by known methods. In order to completely sever the shield, it is necessary for the blades which cut it to penetrate the primary insulation. If the blades making the first cut remain engaged while the outer insulation and braid are removed from TFE primary insulation, the blades will pull the helical wrap out of the shield. An additional problem is the difficulty in cutting completely through TFE primary insulation without severly scoring the signal conductor; an incompletely severed slug likewise leads to pulling out the helical wrap.

SUMMARY OF THE INVENTION

According to the invention, a method for preparing coaxial cable involves first making the circumferential cut at the first distance, then withdrawing the cutting blades before engaging a second set of blades to make the cut at the second distance, which cut is not sufficiently deep to impinge the braided shield. The cable is then withdrawn while the second blades remain engaged, thus removing the slugs of secondary insulation and braid as a unit. Since the TFE primary insulation is "slippery", and not impinged by any blades, the helical wrap remains intact.

According to another aspect of the invention, the method for preparing coaxial cable for termination as descrribed above is further characterized by compressing the primary insulation to expose the signal conductor. This is accomplished by axially aligning a tubular tool with the end of the cable, the tool having an inside diameter just sufficient to accommodate the signal conductor. The tool and the cable are then moved relatively axially together to compress the primary insulation toward the shield as the signal conductor is received in the tool.

According to yet another aspect of the invention, the braided shield is initially flared after removal of the secondary insulation and braid by clamping the outer insulation adjacent the exposed shield and rotating a tool against the cable about a circumferential path. If the tool is rotated against the exposed shield, it compresses the insulation underneath to flare the shield to a generally conical configuration. If the flaring tool is rotated against the exposed primary insulation, the axis of the cable must be displaced, twirling the end, to impart the flare. Additional flaring is provided by compressing the primary insulation as described, and further by a second, conically nosed tubular tool slidable coaxially over the first tool.

The inventive flaring method is advantageous compared to the method described in U.S. Pat. No. 3,555,672 insofar as less stress is imposed on the signal conductor, and the apparatus is simpler.

BRIEF DESCRIPTION OF THE DRAWINGS

FIGS. 1A to 1C are sequential schematics showing cutting of the braid.

FIGS. 2A to 2D are sequential schematics showing the cutting of outer insulation.

FIG. 3 is a partial side view of the radial braid flaring tool and clamp.

FIG. 3A is a schematic end view of the braid flaring operation.

FIG. 4 is a side view of an alternative radial braid flaring scheme.

FIGS. 10-13 show the terminal application sequence.

FIG. 16 is a top section view of the axial tooling.

FIG. 17 is an end section view of the vee guide actuating mechanism.

DETAILED DESCRIPTION OF THE PREFERRED EMBODIMENT

Figure 5:
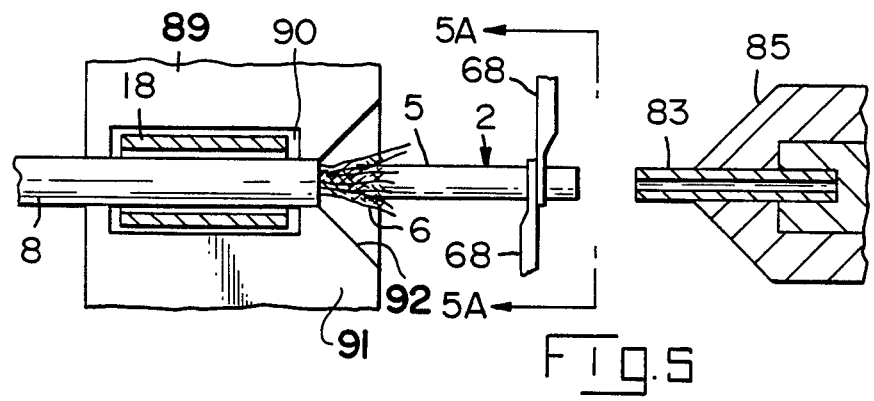
FIG. 5 is a partial top view of the axial tooling and clamp.

FIG. 1A depicts a coaxial cable 2 inserted between a first pair of opposed hinged blades 10 of a rotary wire stripper. The stripper is of the type described in U.S. Pat. No. 3,361,016, which is hereby incorporated by reference. Referring to FIG. 1B, the blades 10 are hinged down and rotated about the axis of cable 2 to make a first circumferential cut 12 through the outer or secondary insulation 8 and braided shield 6 (FIG. 2D) at a first distance from free end 3 of the cable 2. Subsequently, the blades 10 are hinged apart and the cable 2 is removed, as shown in FIG. 1C. The cable 2 is then inserted between the hinged apart blades 14 of a like wire stripper (FIG. 2A), which blades 14 are hinged down and rotated to make a second circumferential cut 16 in the insulation 8 at a second distance from free end 3 (FIG. 2B). The cable 2 is then withdrawn while the blades 14 are hinged down to remove the slugs of insulation and shield as a unit (FIG. 2C) to leave the inner or primary insulation 5 and shield 6 exposed (FIG. 2D). The first blades 10 are set to cut more deeply than the second blades 14, so that the first cut 10 achieves circumferential severing of the braided shield 6 by slightly penetrating primary insulation 5, while the second cut affects only the outer insulation 8. Since the primary insulation 5 is helically wrapped, it is important that blades 10 be removed before attempting to pull free the outer slugs, otherwise the TFE would be pulled from within the braid. The blades 14, though, needn't penetrate shield 6 as any incompletely severed insulation 8 will readily pull free.

Having prepared the cable 2 as shown in FIG. 2D, a crimp ferrule 18 is slid onto outer insulation 8 and the cable is clamped as shown in FIG. 3, the ferrule 18 being received in a cavity 45 formed by clamps 44, 46. A wheel 40 freely journaled to the end of arm 35 is brought into interfering contact with exposed braid 6 and rotated therearound. Since the primary insulation 5 is foamed TFE, it compresses readily, allowing the braid 6 to flare. FIG. 3A shows the flaring operation from the end. FIG. 4 shows the alternative braid flaring method, where wheel 40 contacts the primary insulation 5 of cable 2 beween the braid 6 and free end 3, substantially displacing the cable laterally of its axis during rotation to flare the blaid 6 as shown. This alternative method is suitable also where the primary insulation 5 is relatively incompressible.

Figure 5A:
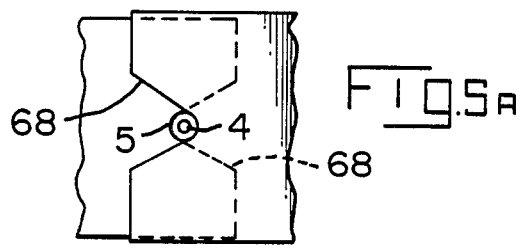
FIG. 5A is an end view of the vee guides.
Figure 6:
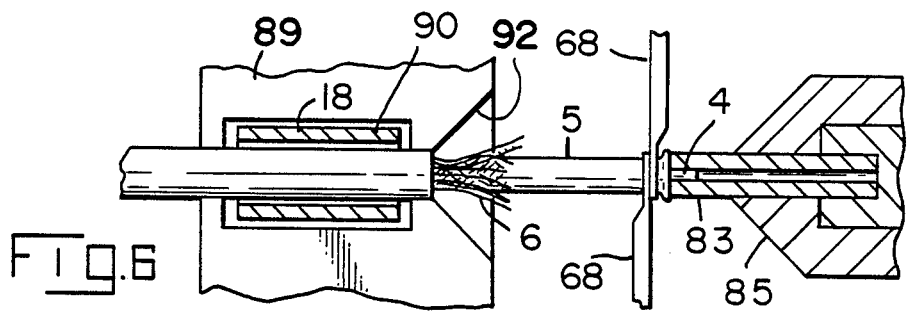
FIG. 6 is a partial top view of the axial tooling as it engages the cable.
Figure 7:
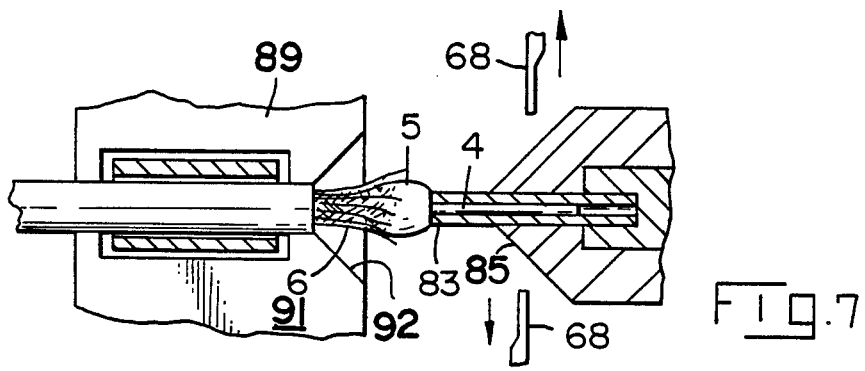
FIG. 7 is a partial side view of the axial tooling as it fully compresses the primary insulation.

After braid flaring, the cable 2 is removed from the clamps 44, 46 and then clamped between upper cup clamp 89 and lower cup clamp 91, the ferrule 18 being received in cavity 90 formed thereby (FIG. 5). The cup clamps 89, 91 form a conical mouth 92 about the flared braid 6. The cable 2 is captured between V-guides 68 toward free end 3, assuring positive axial alignment thereof with compression tube 83, which is mounted to slide coaxially in flare tube 85. Referring to the end view of FIG. 5A, the axial centering of the signal conductor 4 by V-guides 68 is apparent. Being so centered, the conductor 4 is readily received in compression tube 83, as shown in FIG. 6. The inside diameter of tube 83 is just sufficient to accommodate the signal conductor 4, so that the tube 83 axially compresses the foamed TFE primary insulation 5 therearound. The V-guides 68 are then withdrawn and the tube 83 is advanced to further compress the insulation 5, as shown in FIG. 7.

Figure 8:
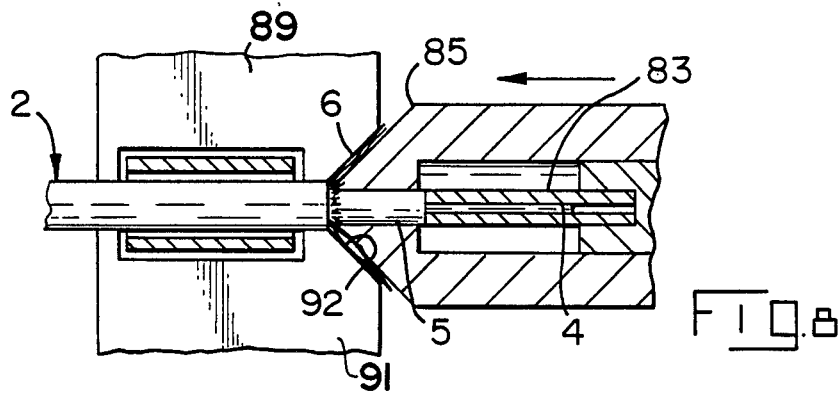
FIG. 8 is a partial side view of the axial tooling as it die forms the braid.
Figure 9:
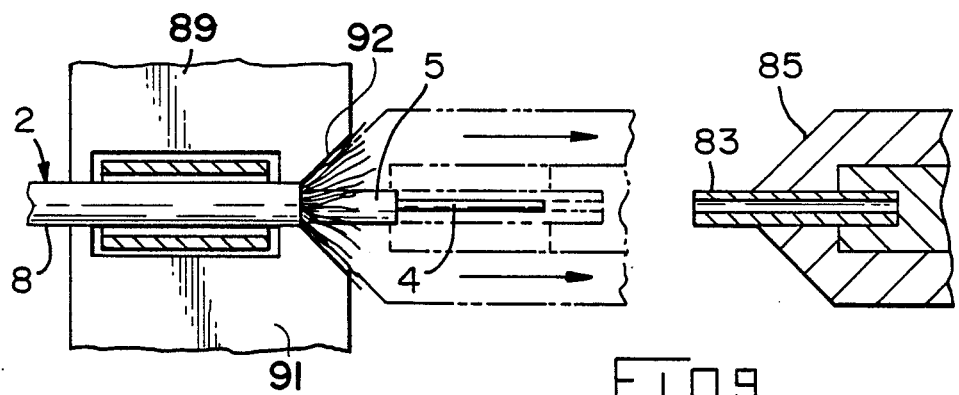
FIG. 9 shows the retreat of the axial tooling.
Figure 10:
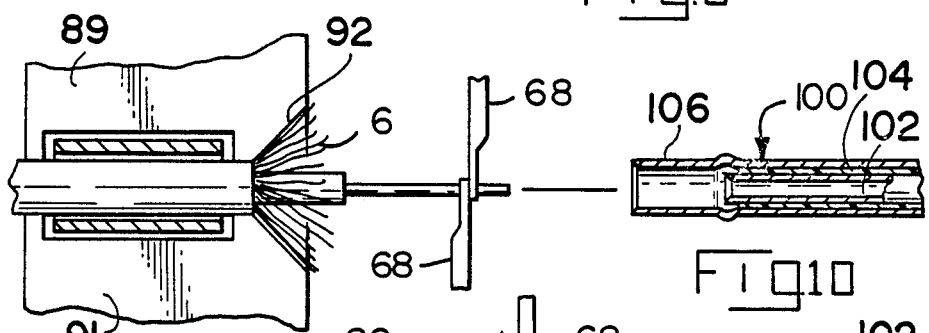
Figure 11:
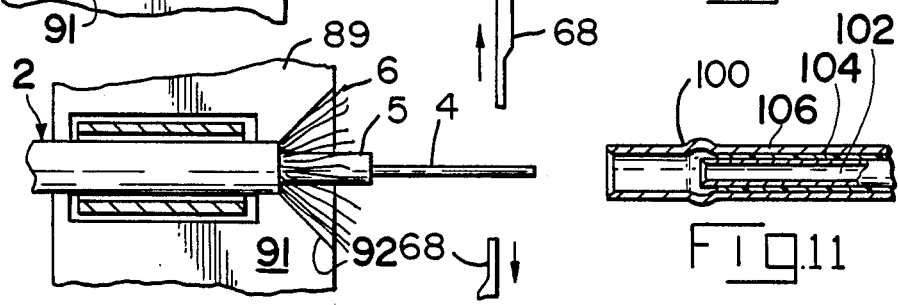

Referring to FIG. 8, the flare tube 85 is then advanced coaxially over the compression tube 83. The flair tube 85 has a conical nose which further flares the exposed portion of braided shield 6 and ultimately die forms it in cooperation with conical mouth 92 of the cup clamps. This advance also axially compresses the foamed TFE primary insulation 5 to substantially its original diameter. The tooling 83, 85 is then withdrawn, as shown in FIG. 9, and the V-guides 68 return to capture the exposed signal conductor 4, as shown in FIG. 10. A coaxial electrical contact 100 is then advanced in axial alignment with the cable 2 and received thereon as the guides 68 are again withdrawn (FIGS. 11 and 12). The contact 100 is of the type described in U.S. Pat. No. 3,323,098 and comprises an inner signal pin 102 which receives signal conductor 4, an insulator 104, and an outer shield 106. Referring to FIG. 13, the clamps 89, 91 are withdrawn and the ferrule 18 is slid forward to trap the braid 6 against the shield 106 to provide shielding continuity between the cable 2 and the terminal 100.

Figure 14:
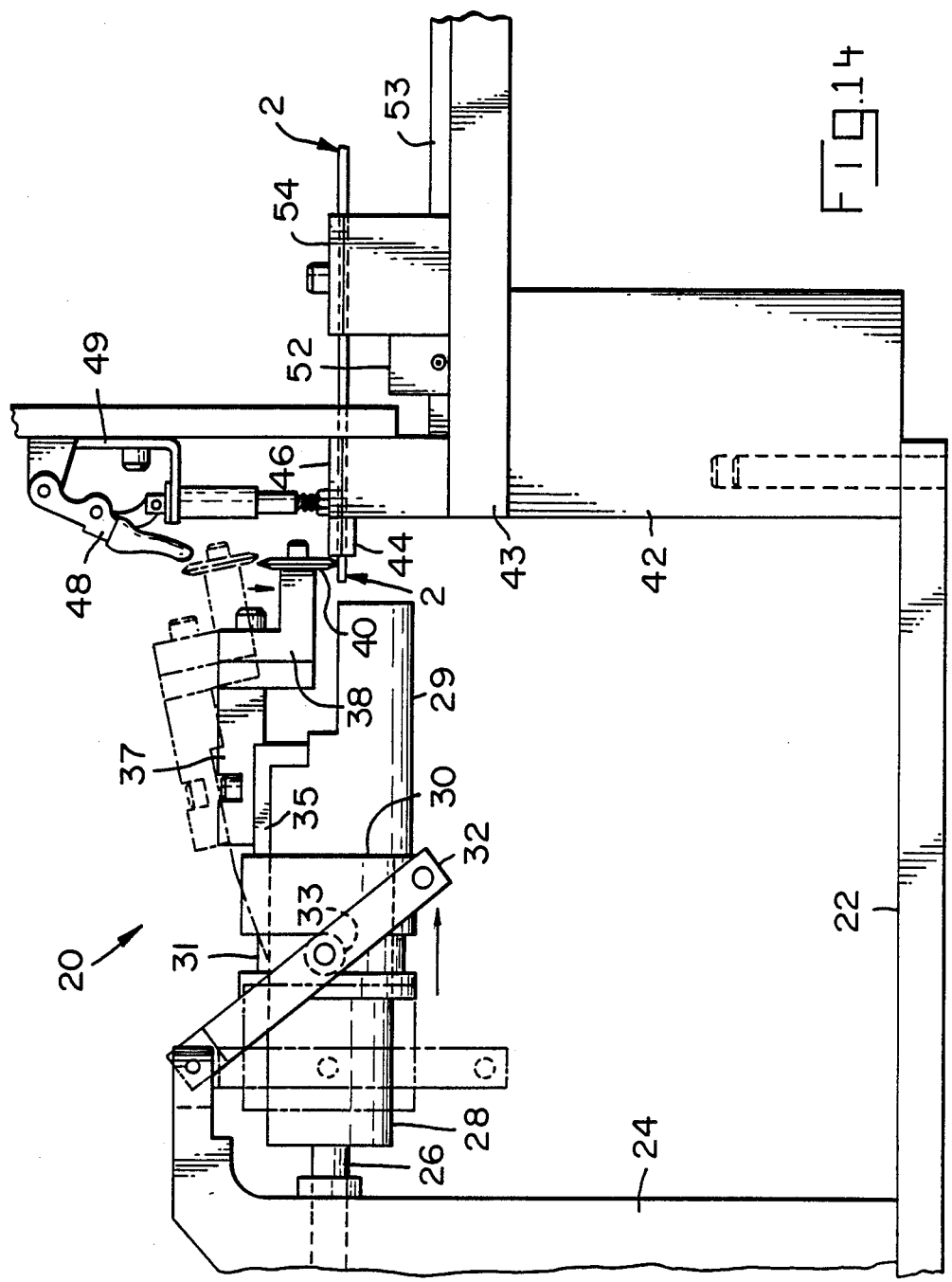
FIG. 14 is a side view of the radial braid flaring apparatus.

Apparatus for practicing the above described method will now be described. Referring to FIG. 14, the braid flaring tool 20 is a bench tool comprising a base 22, a first upright 24, and a second upright 42. A main shaft 26 journaled through upright 24 is turned by an electric motor (not shown) to effect rotation of wheel 40 as shown schematically in FIGS. 3 and 3A. An arm 35 is pivotably mounted in body 28, which is fixed on shaft 26. The arm 35 is spring loaded toward the position shown in phantom, and is moved into the active position by sliding collar 30 rightward on body 28. This is accomplished by manually pivoting link 32, which link has a follower 33 journaled thereto, which follower rides in annular channel 31 on collar 30. The arm 35 comprises an extension 37 with an ell 38 fixed thereto, which ell carries the wheel 40.c Referring still to FIG. 14, a platform 43 on upright 42 provides support for the various fixtures which align the cable 2 relative to wheel 40. The cable 2 is fixed in a clamping block 54, which block is received slidably on rail 53 and slid against index block 52. The block 52 is adjustably positioned on the rail 53 and provides means for positively positioning the end of cable 2. A toggle link 48 mounted on bracket 49 serves to urge upper clamp 46 toward lower clamp 44 to clamp the cable toward the end thereof to position it laterally relative to wheel 40.

Figure 15:
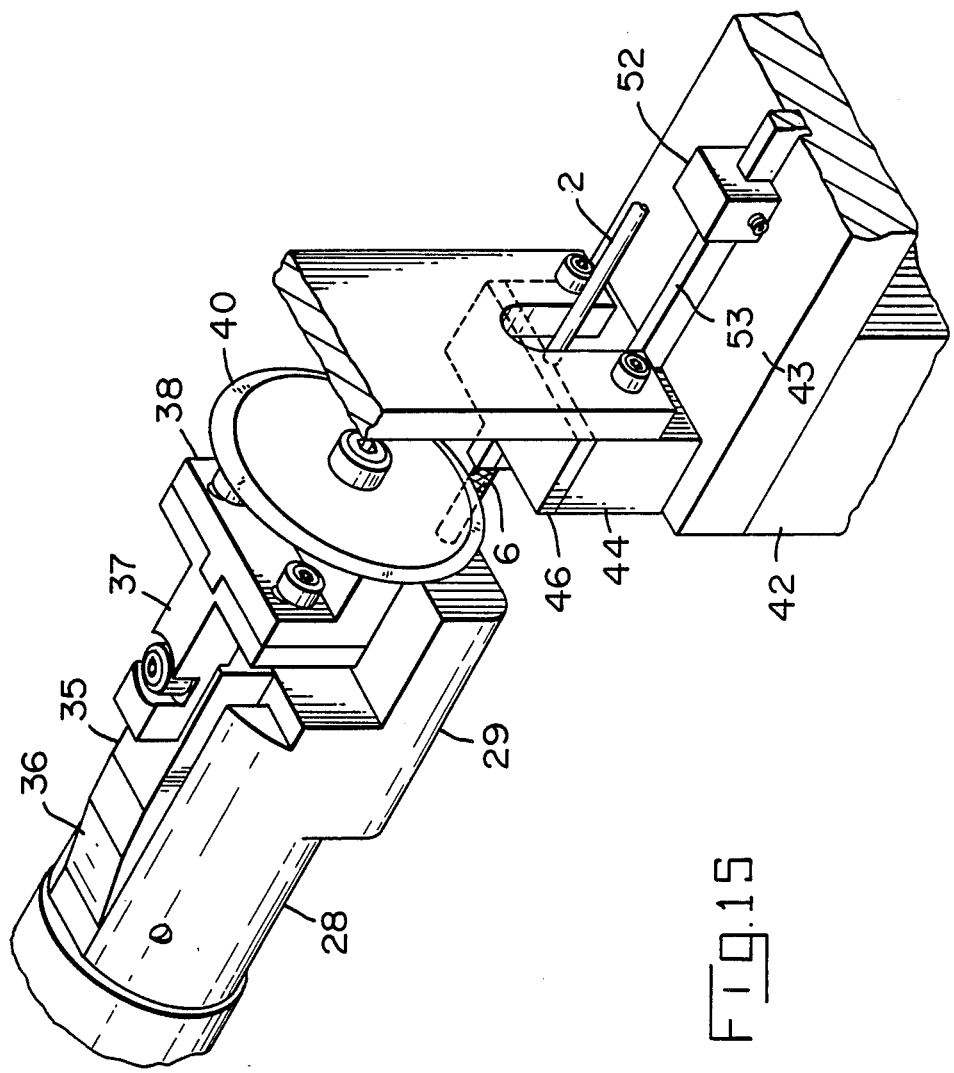
FIG. 15 is a perspective of the radial braid flaring apparatus.

FIG. 15 is a perspective of the braid flaring tool 20, which, taken with FIG. 14, clarifies features referred to above. The arm 35 has a ramped surface 36 against which collar 30 rides to pivot the arm 35 to the position shown. The body 28 incorporates a counterweight 29 which is balanced against the mass of arm 35 and wheel 40 during rotation. The cable 2 is held between clamps 44, 46 with the exposed braid 6 impinged by wheel 40 as shown. Index block 52 on rail 53 serves an axial positioning function as previously described.

FIG. 16 is a top section view of the bench tool 60 which provides the final flaring for termination (shown schematically in FIGS. 5 to 9). A clamp block 96 on rail 95 is slid against index block 94 to axially position the cable 2. The cup clamp 89 is then applied so that the braid 6 is situated in conical mouth 92. The compression tube 83 is shown compressing the primary insulation 5 (corresponding to FIG. 7) after the V-guides 68 have retracted. The V-guides 68 are fixed to blocks 66 which in turn are fixed to respective slides 67. The guides 68 are urged apart by springs 70 and urged together by downward travel of a cam block 72 which acts on followers 69 journaled to respective slides 67 (see also FIG. 16). Axial movement of the compression tube 83 as a unit with the flare tube 85 is effected by pushing extension 84, which is supported at the rear by bracket 87 fixed to main upright 64. Independent advance of the flare tube 85 is achieved by bearing on extension 86 thereof.

FIG. 17 depicts the mechanism of urging the slides together; applicaton of finger 73 by a toggle mechanism above (not shown) urges cam block 72 down against springs 75, so that cam surfaces 74 urge followers 69 together. The compression tube 83 and flare tube 85 are accommodated by slot 76. The block 72 rides in upright 64, which is adjustably mounted to base 62.

Subsequent to cable preparation, known apparatus having crimping dies as described in U.S. Pat. No. 3,555,672 is used to terminate a coaxial contact to the cable.

The foregoing is exemplary and not intended to limit the scope of the claims which follow.

We claim:

1. A method of preparing coaxial cable proximate the end thereof for termination to a coaxial electrical contact, said cable being of the type comprising a signal conductor, inner insulation surrounding said signal conductor, a braided metal shield surrounding said inner insulation, and an outer insulative jacket surrounding said shield, said method comprising the steps of:
cutting through said outer insulative jacket and said shield circumferentially at a first distance from said end with blade means,
withdrawing said blade means,
cutting said outer insulative jacket circumferentially at a second distance from said end with said blade means, said second distance being greater than said first distance,
removing the outer insulative jacket from said second distance to said end and said shield from said first distance to said end as a unit.

2. The method of claim 1 comprising the further steps of:
initially flaring the shield to a generally conical configuration,
axially aligning a first tubular tool with the end of said cable, said tool having an inside diameter just sufficient to accommodate said signal conductor,
moving said first tool and said cable relatively axially together to compress said inner insulation toward said flared shield, said signal conductor being received in said first tool.

3. The method of claim 2 comprising the further step of moving a second tubular tool relatively axially toward said flared shield, said second tool being slidably coaxially about said first tool, said second tool having an inside diameter sufficient to accommodate the inner insulation, said second tool having a generally conical nose profiled to further flare said shield.

4. The method of claim 3 comprising the additional step of clamping a clamping means on said outer jacket adjacent the exposed shield, said clamping means forming a generally conical cavity about the exposed shield, said cavity being profiled to receive said conical nose of said second tool therein.

5. The method of claim 2 wherein the initial flaring is accomplished by rotating a flaring blade against the exposed shield about a circumferential path on said shield, said blade radially compressing said primary insulation through said shield to cause said initial flaring.

6. The method of claim 5 wherein said flaring blade rotates freely about an axis which follows a circular path about said cable, said blade having a circular circumferential profile which follows said circumferential path on said shield.

7. A method of preparing coaxial cable proximate the end thereof for termination to a coaxial electrical contact, said cable being of the type comprisng a signal conductor, inner insulation surrounding said signal conductor, a braided metal shield surrounding said inner insulation, and an outer insulative jacket surrounding said shield, said method comprising the steps of
removing said outer jacket to a second distance from said end,
removing said shield to a first distance from said end, said first distance being less than said second distance, said shield being exposed from said first distance to said second distance, said inner insulation being exposed from said first distance to said end,
initially flaring the shield to a generally conical configuration, said flaring being accomplished by rotating a flaring tool against the exposed shield about a circumferential path on said shield, said tool radially compressing said inner insulation through said shield to cause said initial flaring.

8. The method of claim 7 comprising the additional steps of
axially aligning a first tubular tool with the end of said cable, said tool having an inside diameter just sufficient to accommodate said signal conductor,
moving said first tool and said cable relatively axially together to compress said inner insulation toward said flared shield, said signal conductor being received in said first tool.

9. The method of claim 8 comprising the further step of:
moving a second tubular tool relatively axially toward said flared shield, said second tool being slidable coaxially about said first tool, said second tool having an inside diameter sufficient to accommodate the inner insulation, said second tool having a generally conical nose profiled to further flare said shield.

10. The method of claim 9 comprising the additional step of
clamping a clamping means on said outer jacket adjacent the exposed shield, said clamping means forming a generally conical cavity about the exposed shield, said cavity being profiled to receive said conical nose of said second tool therein.

11. A method of preparing coaxial cable proximate the end thereof for termination to a coaxial electrical contact, said cable being of the type comprising a signal conductor, inner insulation surrounding said signal conductor, a braided metal shield surrounding said inner insulation, and an outer insulative jacket surrounding said shield, said method comprising the steps of
removing said outer jacket to a second distance from said end,
removing said shield to a first distance from said end, said first distance being less than said second distance, said shield being exposed from said first distance to said second distance, said inner insulation being exposed from said first distance to said end initially flaring the shield to a generally conical configuration, said flaring being accomplished by clamping said outer jacket adjacent the exposed shield and rotating a tool against the cable about a circumferential path between the second distance and the end.

12. The method of claim 11 wherein the flaring tool is rotated against the exposed shield, compressing the inner insulation.

13. The method of claim 11 wherein the flaring tool is rotated against the exposed inner insulation, displacing the axis of the cable and twirling the end thereof.

14. A method of preparing an end section of a coaxial cable for termination to an electrical coaxial contact, the coaxial cable comprising a signal conductor, inner insulation covering the signal conductor, an outer conductor covering the inner insulation, and an outer insulative jacket covering the outer conductor, the method comprising the steps of:

cutting circumferentially through the outer insulative jacket and the outer conductor at a first position along the end section of the cable spaced inwardly from the end of the cable;

cutting circumferentially through the outer insulative jacket at a second position along the end section of the cable spaced inwardly from the first position; and removing the outer insulative jacket from the second position to the end and the outer conductor from the first position to the end as a unit.

15. A method as claimed in claim 14 comprising the further steps of:

flaring the outer conductor to a generally conical configuration;

compressing the inner insulation toward the flared outer conductor thereby exposing an end of the signal conductor; and terminating center and outer contact members of the electrical coaxial contact respectively to the signal conductor and outer conductor.

16. A method of preparing an end section of a coaxial cable for termination to an electrical coaxial contact, the coaxial cable comprising a signal conductor, inner insulation covering the signal conductor, an outer conductor covering the inner insulation, and an outer insulative jacket covering the outer conductor, the method comprising the steps of:

cutting circumferentially through the outer insulative jacket at first and second positions along the end section of the cable spaced inwardly from the end of the cable, the first position being closer to the end than the second position, the outer conductor being also circumferentially cut through at first position; and removing the outer insulative jacket from the second position to the end and the outer conductor from the first position to the end as a unit.

17. A method as claimed in claim 16, wherein the cutting of the outer insulative jacet at the first and second positions takes place at different times.

18. A method as claimed in claim 16, comprising the further steps of:

flaring the outer conductor to a generally conical configuration;

compressing the inner insulation toward the flared outer conductor thereby exposing an end of the signal conductor; and terminating center and outer contact members of the electrical coaxial contact respectively to the signal conductor and outer conductor.

* * * * *

UNITED STATES PATENT OFFICE
CERTIFICATE OF CORRECTION

Patent No. 4,719,697　　　　　　　　　　Dated January 19, 1988

Inventor(s) Benjamin Schwartzman, Russell A. Clearwater, Robert Volinskie

It is certified that error appears in the above-identified patent and that said Letters Patent are hereby corrected as shown below:

Column 5, claim 3, line 60, "slidably" should be --slidable--.

Column 6, claim 7, line 16, "comprisng" should be spelled --comprising--.

Column 8, claim 16, line 19, after "at" add --said--.

Signed and Sealed this

Twenty-fourth Day of May, 1988

*Attest:*

DONALD J. QUIGG

*Attesting Officer*　　　*Commissioner of Patents and Trademarks*